C. H. SHEPARD.
HOOF EXPANDER.
No. 182,608. Patented Sept. 26, 1876.
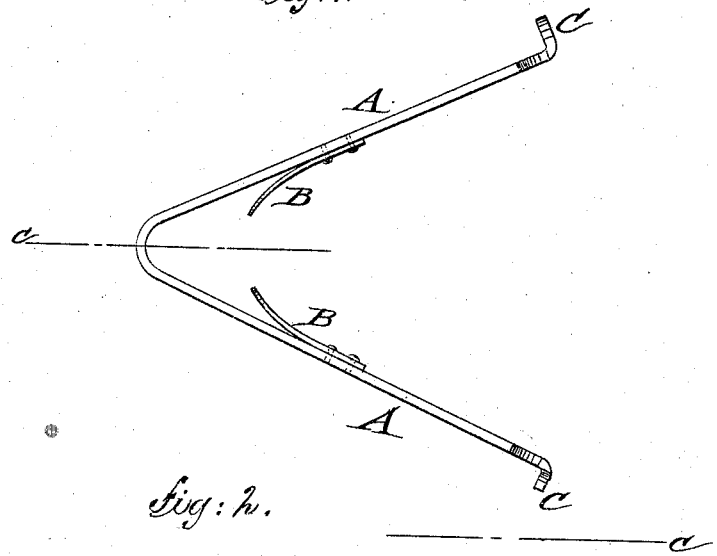
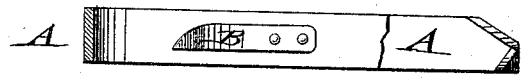
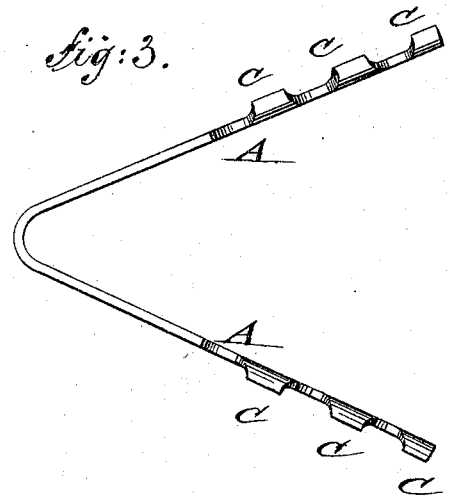
WITNESSES:
Chas. Nitta
John Goethals
INVENTOR:
C. H. Shepard
BY
ATTORNEYS.

UNITED STATES PATENT OFFICE.

CHARLES H. SHEPARD, OF ELIZABETH, NEW JERSEY.

IMPROVEMENT IN HOOF-EXPANDERS.

Specification forming part of Letters Patent No. 182,608, dated September 26, 1876; application filed March 13, 1876.

*To all whom it may concern:*

Be it known that I, CHARLES HENRY SHEPARD, of Elizabeth, in the county of Union and State of New Jersey, have invented a new and Improved Device for Expanding Hoofs, of which the following is a specification:

In the accompanying drawing, Figure 1 represents a top view of my improved device for expanding hoofs. Fig. 2 is a vertical longitudinal section of the same on line $c\,c$, Fig. 1; and Fig. 3, a bottom view of a modified form of the expanding spring.

Similar letters of reference indicate corresponding parts.

The invention has reference to an improved device for preventing and curing contraction of the hoofs of horses or mules; and consists of a V-shaped spring having inner opposite rings and projections, the whole secured by suitable devices to the interior of the hoof.

In the drawing, a represents a V-shaped mainspring, of steel or any other material having sufficient strength and elasticity. The spring A is intended to be secured into the cleft of the frog, or cavity between the frog and hoof, so as to act by its outward pressure on the shell of the hoof at the heel, or on the bar of the hoof, or both, as may be desired. The sides or legs of spring A may be slightly curved in outward or inward direction, to conform to the interior shape of the hoof. The mainspring A is attached to the frog and to the hoof, surrounding the frog by means of lighter interior springs B, that are riveted or otherwise applied to the mainspring, and by outwardly-curved tapering projections or prongs C, that are forced into the bar or the bar and shell of the hoof. The light springs B that press on the frog are shown in Figs. 1 and 2, and serve to prevent the point or apex of the mainspring from dropping at the point of the frog, while one or more outer-tapering flanges or projections, C, are forced, when the spring is adjusted by its pressure into the bar or shell of the hoof, at or near the heel, so as to prevent the mainspring from dropping at the heel. The inner springs may be dispensed with when a greater number of tapering outer prongs or projections C, as shown in Fig. 3, are employed, as thereby the mainspring is set and securely retained in the hoof, the prongs acting as supports in place of the springs. The expanding-spring may be applied to the hoof whether the same is provided with a shoe or not, as its action is entirely independent of the shoe. The expanding-spring forms an exceedingly simple and effective device for curing or preventing contraction of the hoof, as it attaches and embeds itself readily into the same without giving the least inconvenience to the animal.

Having thus described my invention, I claim as new and desire to secure by Letters Patent—

The V-spring A, provided with the interior and opposite springs B B, and the projections C, substantially as and for the purpose specified.

CHARLES HENRY SHEPARD.

Witnesses:
PAUL GOEPEL,
T. B. MOSHER.